United States Patent
Inoue et al.

(10) Patent No.: US 6,743,465 B2
(45) Date of Patent: Jun. 1, 2004

(54) MAGNETIC OPTICAL MEMBER WITH A POLYMER SUBSTRATE

(75) Inventors: Mitsuteru Inoue, Okazaki (JP); Toshitaka Fujii, Toyohashi (JP); Akio Takayama, Iwata-gun (JP); Atsushi Kitamura, Iwata-gun (JP); Shigeyuki Adachi, iwata-gun (JP); Hideki Kato, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 126 days.

(21) Appl. No.: 09/974,850

(22) Filed: Oct. 12, 2001

(65) Prior Publication Data
US 2002/0025450 A1 Feb. 28, 2002

Related U.S. Application Data

(62) Division of application No. 09/594,686, filed on Jun. 16, 2000, now abandoned.

(30) Foreign Application Priority Data

Oct. 4, 1999 (JP) ............................................. 11-283512

(51) Int. Cl.⁷ ........................... C23C 14/34; C23C 16/00
(52) U.S. Cl. .................... 427/130; 427/166; 204/192.2; 204/192.26
(58) Field of Search ...................... 204/192.2, 192.26; 427/130, 166

(56) References Cited

U.S. PATENT DOCUMENTS

| | | | |
|---|---|---|---|
| 4,444,615 A | 4/1984 | Matsuzawa et al. | ............ 117/6 |
| 4,637,953 A | 1/1987 | Sawamura et al. | |
| 4,952,295 A | 8/1990 | Kawabata et al. | ...... 204/192.15 |
| 5,169,504 A * | 12/1992 | Bechevet et al. | ....... 204/192.26 |
| 5,340,647 A | 8/1994 | Matsubaguchi et al. | ..... 428/336 |
| 5,492,775 A * | 2/1996 | Ahlert et al. | ............ 428/694 T |
| 5,665,468 A | 9/1997 | Sekiya et al. | |
| 5,667,861 A | 9/1997 | Harth et al. | |
| 5,920,420 A | 7/1999 | Ishikura et al. | .............. 359/282 |
| 5,923,625 A | 7/1999 | Shimazaki et al. | |
| 6,262,949 B1 * | 7/2001 | Inoue et al. | ................... 369/13 |

FOREIGN PATENT DOCUMENTS

| | | |
|---|---|---|
| EP | 239390 A2 | 9/1987 |
| EP | 0 407 945 A1 | 1/1991 |
| EP | 0 428 155 A2 | 5/1991 |
| GB | 1 393 337 | 5/1975 |
| JP | 05 250745 A | 9/1993 |
| JP | 11-204334 * | 7/1999 |
| WO | WO 99/39341 A | 8/1999 |

OTHER PUBLICATIONS

Computer translation of 11–204334.*

* cited by examiner

*Primary Examiner*—Rodney G. McDonald
(74) *Attorney, Agent, or Firm*—Oliff & Berridge, PLC

(57) ABSTRACT

This invention provides a magnetic optical member that can obtain a large magneto-optical effect using a rare-earth iron-garnet-based material and a method of producing the same.

2 Claims, 7 Drawing Sheets heating pattern

XRD pattern

Faraday spectrum transmissivity spectrum before heat treatment peak wavelength spectrum before heat treatment transmissivity spectrum after heat treatment peak wavelength spectrum after heat treatment

MAGNETIC OPTICAL MEMBER WITH A POLYMER SUBSTRATE

BACKGROUND OF THE INVENTION

1. Field of the Invention

The present invention relates to a magnetic optical member used in an optical isolator and an optical magnetic recording medium and the like, and to a method of producing the same.

2. Description of the Related Art

An optical isolator used in optical fiber communication systems generally includes, for example, a pair of polarizers and a Faraday rotator interposed between the pair of polarizers. The Faraday rotator has the Faraday effect (magneto-optical effect) and rotates a polarizing surface of incident light by 45 degrees, that is the Faraday rotational angle is set to 45 degrees.

Recently, in addition to the optical isolator, an optical device utilizing the above-mentioned magneto-optical effect (hereinafter referred to as magnetic optical member), such as an optical magnetic recording medium (an optical magnetic disk) and an optical switch has been greatly used.

In recording of optical magnetic recording using, for example, an optical magnetic recording medium (an optical magnetic disk), temperature of the optical magnetic recording medium is locally increased by irradiation with laser light and recording is made with an external magnetic field only in the local portion where coercive force was decreased by the temperature increase. Since the spot diameter of the laser light can be reduced to about its wavelength, that is, a submicron length or so by narrowing the light with a lens, high density recording can be performed when combined with a vertically magnetized film as a recording medium.

The reproduction of information recorded on the optical magnetic recording medium utilizes the principle (Kerr effect) that when an optical magnetic recording medium is irradiated with linearly polarized laser light, rotation is made in mutually opposite directions depending on the direction of the polarizing surface to the reflected light, that is, depending on whether the direction is upward or downward with respect to the vertical direction to the film surface. On the optical magnetic recording medium (an optical magnetic disk), a laser light guiding groove is formed into a spiral shape so that minute recording bits can be correctly recorded and reproduced. The reproducing device (optical magnetic disk drive) is provided with an automatic focusing mechanism and an automatic tracking mechanism for tracking the laser light along the groove in the optical system (pick-up head).

Further, recently high densification has been required for the optical magnetic recording medium, and development of a blue color laser for narrowing the laser light has been attempted. In this case, an optical magnetic recording medium (magnetic optical member) having a large Kerr rotational angle for short wavelength laser light is required. Since rare earth iron garnet based materials, for example, bismuth-substituted rare earth iron-garnet (BiYIG) and the like have a large Kerr rotation (magneto-optical effect) at the short wavelength, even if the recording spot diameter, that is, the recording area is reduced, a large signal can be obtained. Thus, to form a magnetic optical member using BiYIG with a large magneto-optical effect is considered.

Incidentally, the crystal structure of the BiYIG is amorphous just after the film formation, and annealing treatment to enhance crystallinity at 600° C. or more is needed for obtaining large Hc (and excellent magnetic optical characteristics). On the other hand, the optical magnetic recording medium is generally placed on a resin substrate, which is deformed by the above-mentioned heat treatment. Therefore, under the above circumstances, it is difficult to form the optical magnetic recording medium using a rare earth iron garnet based magnetic material, and an excellent magneto-optical effect that the rare earth iron garnet based material possesses cannot be utilized.

Incidentally, it is thinkable that glass is used as the substrate. However, a glass substrate is difficult to form a guiding groove for laser light. Therefore, the use of the glass was not effective as the solution of the above-mentioned problems.

SUMMARY OF THE INVENTION

The present invention has been made in view of the above-mentioned circumstances and, therefore, an object of the present invention is to provide a magnetic optical member that can obtain a large magneto-optical effect using a rare earth iron garnet based material, and a method of producing the same.

According to a first aspect of the present invention, a magnetic optical member is characterized by comprising a polymeric substrate on which a magnetic optical thin film made of crystalline rare earth iron garnet is formed.

According to a second aspect of the present invention, the magnetic optical member in the first aspect of the present invention is characterized in that there are provided two dielectric multi-layer films in which plural kinds of dielectric materials having different optical characteristics are alternately laminated with regularity in thickness, and in that the magnetic optical thin film is placed between the two dielectric multi-layer films.

According to a third aspect of the present invention, the magnetic optical member in the first or second aspect of the present invention is characterized in that the polymeric substrate is a thermoplastic resin substrate.

According to a fourth aspect of the present invention, the magnetic optical member in any one of the first to third aspects of the present invention is characterized in that the polymeric substrate is a tape-shaped, film-shaped, or sheet-shaped substrate.

According to a fifth aspect of the present invention, the magnetic optical member in any one of the first to fourth aspects of the present invention is characterized in that the magnetic optical thin film is capable of magnetic recording.

According to a sixth aspect of the present invention, a method of producing a magnetic optical member comprising: two dielectric multi-layer films in which plural kinds of dielectric materials having different optical characteristics are alternately laminated with regularity in thickness; a magnetic optical thin film of rare earth iron-garnet, placed between the two dielectric multi-layers; and a polymeric substrate on which the layers and film are formed, is characterized in that the magnetic optical thin film is crystallized without deforming the polymeric substrate by the pulse heating wherein infrared beam is intermittently irradiated.

According to a seventh aspect of the present invention, the method of producing a magnetic optical member in the sixth aspect of the present invention is characterized in that the magnetic optical thin film is heated without disordering the cyclic structure of the dielectric multi-layer films.

According to an eighth aspect of the present invention, the method of producing a magnetic optical member in the sixth or seventh aspect of the present invention is characterized in that the polymeric substrate is cooled during heating the magnetic optical thin film.

According to a ninth aspect of the present invention, the method of producing a magnetic optical member in the sixth aspect of the present invention is characterized by using, in place of the infrared beam, laser light having a wavelength with which the light is not absorbed in the polymeric substrate but is absorbed in the magnetic optical thin film.

According to a tenth aspect of the present invention, the method of producing a magnetic optical member in the ninth aspect of the present invention is characterized in that the laser light has a wavelength with which the light is not absorbed in the dielectric multi-layer film.

According to an eleventh aspect of the present invention, the method of producing a magnetic optical member in the tenth aspect of the present invention is characterized in that scanning with the laser light is performed.

According to a twelfth aspect of the present invention, the method of producing a magnetic optical member in any one of the sixth to eleventh aspects of the present invention is characterized in that the polymeric substrate is a thermoplastic resin substrate.

According to a thirteenth aspect of the present invention, the method of producing a magnetic optical member in any one of the sixth to twelfth aspects of the present invention is characterized in that the polymeric substrate is a tape-shaped, film-shaped, or sheet-shaped substrate.

According to a fourteenth aspect of the present invention, the method of producing a magnetic optical member in any one of the sixth to thirteenth aspects of the present invention is characterized in that the magnetic optical thin film is capable of magnetic recording.

BRIEF DESCRIPTION OF THE DRAWINGS

In the accompanying drawings.

DETAILED DESCRIPTION OF THE PREFERRED EMBODIMENT

A description will be given in the following on a one dimensional magnetic optical crystal (magnetic optical member) according to a first embodiment of the present invention and a method of producing the same, with reference to FIGS. 1 to 9.

Figure 1:
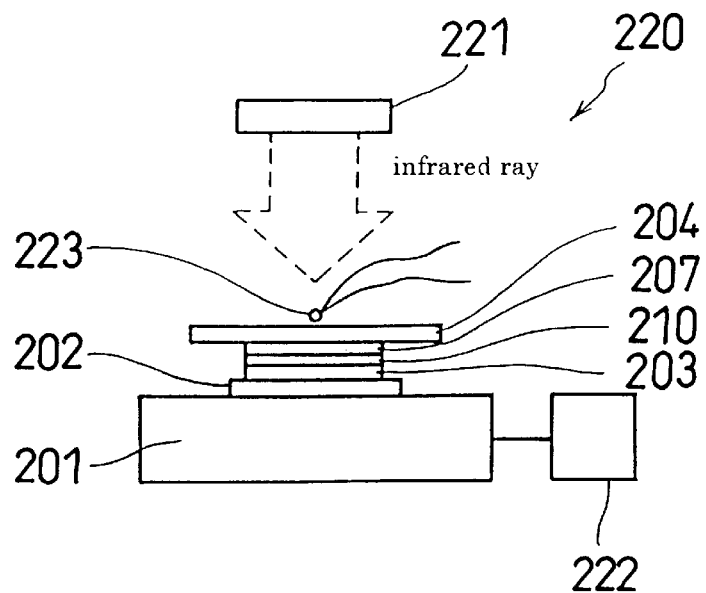
FIG. 1 is a view showing an infrared ray introducing heater 220 according to a first embodiment of the present invention.
Figure 2:
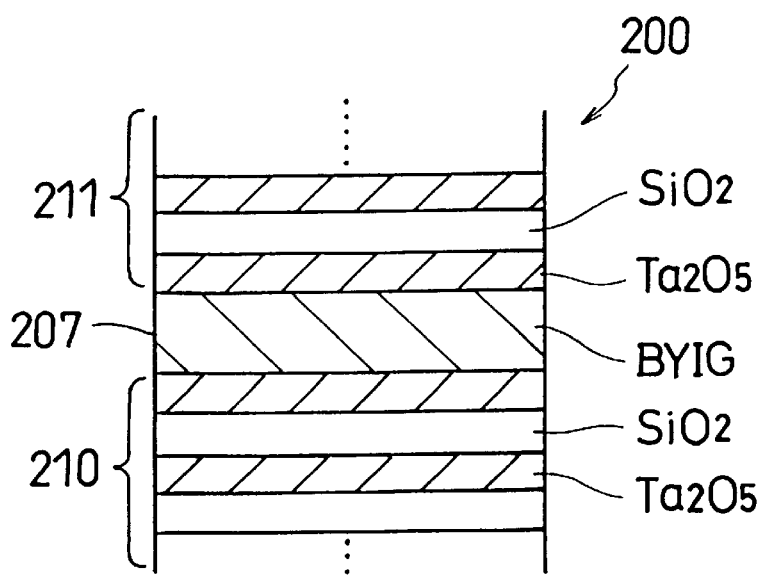
FIG. 2 is a cross-sectional view showing a one dimensional magnetic optical crystal according to the first embodiment of the present invention.

In this first embodiment as shown in FIGS. 1 and 2, an indium sheet 202 is set on a water-cooled substrate holder 201, a polymeric substrate 203 is placed on the indium sheet 202, and a glassy carbon 204 as a light condensing plate is set on the polymeric substrate 203.

On the polymeric substrate 203 is laminated a $(SiO_2/Ta_2O_5)^n$ layer 210 (one of dielectric multi=layer films, n: the number of the laminated layers) in which a $Ta_2O_5$ film (dielectric material) and a $SiO_2$ film (dielectric material) having different optical characteristics are alternately laminated with regularity in thickness. The $Ta_2O_5$ film (dielectric material) and the $SiO_2$ film (dielectric material) are transparent in the visible ray region and are formed with an oxide having high environmental stability.

The polymeric substrate 203 is made of a thermoplastic resin such as PMMA (polymethyl methacrylate) or PC (polycarbonate) or the like, and takes a tape shape, a film shape, or a sheet shape.

Further, on this $(SiO_2/Ta_2O_5)^n$ layer 210 is formed a bismuth substituted yttrium-iron-garnet thin film (BiYIG thin film) 207 (a magnetic optical thin film) which becomes capable of magnetic recording by heat treatment described later. Then, the BiYIG thin film 207 in this state is subjected to heat treatment for crystallization with an infrared ray introducing heater 220 as will be described later. After that, on the $(SiO_2/Ta_2O_5)^n$/BiYIG including the crystallized BiYIG thin film 207 is formed a $(Ta_2O_5/SiO_2)^n$ layer 211 (the other of the dielectric multi-layer films) to form a one dimensional magnetic optical crystal 200 (one dimensional photonic crystal) having a $(SiO_2/Ta_2O_5)^n$/BiYIG/$(Ta_2O_5/SiO_2)^n$ structure shown in FIG. 2. In forming the one dimensional magnetic optical crystal 200 a sputtering device is used.

The infrared ray introducing heater 220 includes an infrared ray generating portion 221 for generating an infrared beam, a glassy carbon 204 for condensing the infrared beam, a cooling mechanism 222 for cooling the substrate holder 201, and a thermocouple 223 that is placed in contact with the surface of the glassy carbon 204 and is used as a temperature monitor during heating.

In the heat treatment for crystallization of the BiYIG thin film 207 with the infrared ray introducing heater 220, the non-heat-resisting substrate 203 and the $(SiO_2/Ta_2O_5)^n$ layer 210 are cooled through the substrate holder 201.

On the other hand, during the heat treatment only the BiYIG thin film 207 is heated by the glassy carbon 204 whose temperature has been increased with infrared rays, to thereby crystallize the film and obtain excellent magnetic characteristics. In this case, the infrared beam is intermittently emitted (pulse-heated).

In this first embodiment, the BiYIG thin film 207 is formed on the $(SiO_2/Ta_2O_5)^n$ layer 210 and is subjected to heat treatment for crystallization with infrared rays while cooling the polymeric substrate 203 and the $(SiO_2/Ta_2O_5)^n$ layer 210 through the substrate holder 201. Having been cooled, the polymeric substrate 203 is prevented from being deformed. Thus, heat treatment to crystallize the BiYIG thin film 207 can be performed.

The BiYIG thin film 207 is crystallized by the above heat treatment, obtaining a large magneto-optical effect.

Further, since the polymeric substrate 203 is cooled as mentioned above, a thermoplastic resin substrate or a tape-shaped, film-shaped or sheet-shaped substrate can be used as the polymeric substrate 203, whereby easy handling of the substrate and downsizing can be realized.

In the above-mentioned conventional art, when an optical magnetic recording medium (magnetic optical member) is obtained using BiYIG, heat treatment at 600° C. or more is required to obtain excellent magnetic optical characteristics by crystallizing BiYIG. Thus, it is necessary to use glass as a substrate. On the other hand, in the present embodiment, the polymeric substrate 203 is cooled as mentioned above, and there is no need to use glass as a substrate. The guiding groove for laser light is therefore easy to form, and since the substrate is not limited to glass (heat-resisting member), the member is applicable in wider field, whereby the improvement of the productivity can be attained.

Further, the $(SiO_2/Ta_2O_5)^n$ layer 210 is cooled as described above, preventing the interdiffusion of $Ta_2O_5$ and $SiO_2$ in the $(SiO_2Ta_2O_5)^n$ layer 210, so that the heat treatment for crystallization of the BiYIG thin film 207 can be performed. Further, by subjecting the BiYIG thin film 207 to heat treatment to crystallize, excellent magnetic characteristics are generated, resulting in the production of the one dimensional magnetic optical crystal 200 (one dimensional photonic crystal) having excellent magnetic optical characteristics. This one dimensional magnetic optical crystal 200 can be used as an optical magnetic recording medium, owing to the excellent magnetic characteristics of the BiYIG thin film 207 obtained through crystallization.

Further, the one dimensional magnetic optical crystal 200 of $(SiO_2/Ta_2O_5)^n/BiYIG/(Ta_2O_5/SiO_2)^n$ structure can find another use such as an optical isolator by separating the polymeric substrate 203 joined thereto.

The first embodiment takes as an example a case where the polymeric substrate 203 and the $(SiO_2/Ta_2O_5)^n$ layer 210 are cooled through the substrate holder 201. However, the polymeric substrate 203 and $(SiO_2/Ta_2O_5)^n$ layer 210 may be directly cooled.

Figure 3:
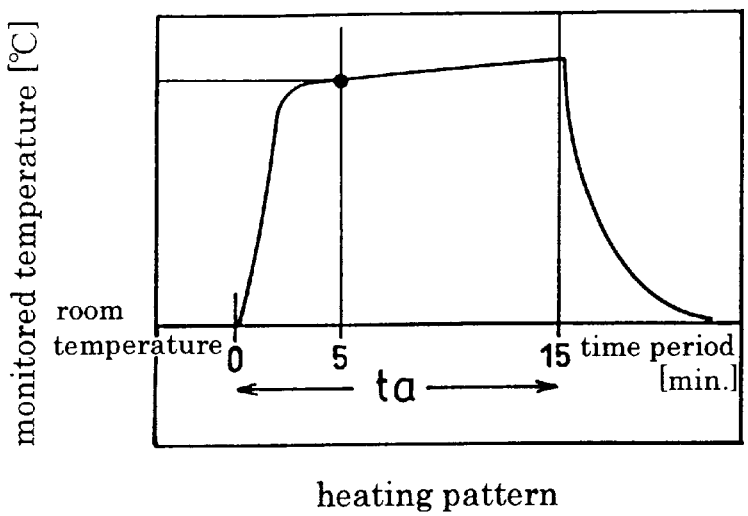
FIG. 3 is a view showing a heat treatment pattern by the infrared ray introducing heater of FIG. 1.
Figure 4:
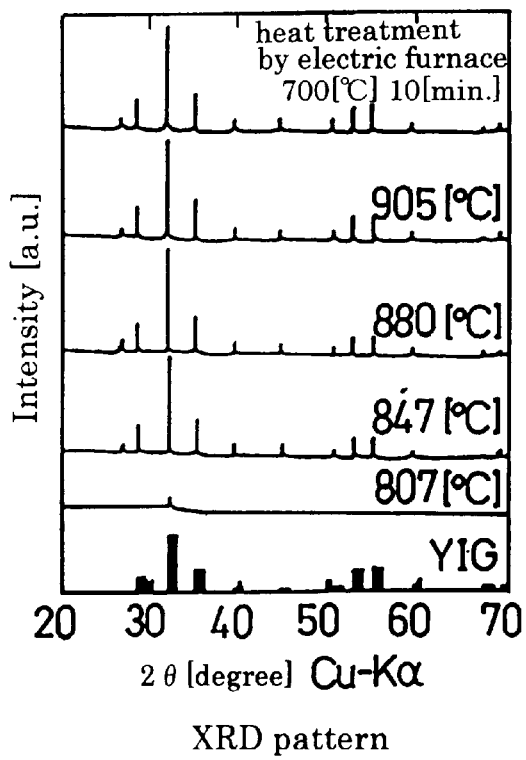
FIG. 4 is a view showing the X-ray diffraction pattern of the one dimensional magnetic optical crystal subjected to heat treatment for crystallization.
Figure 5:
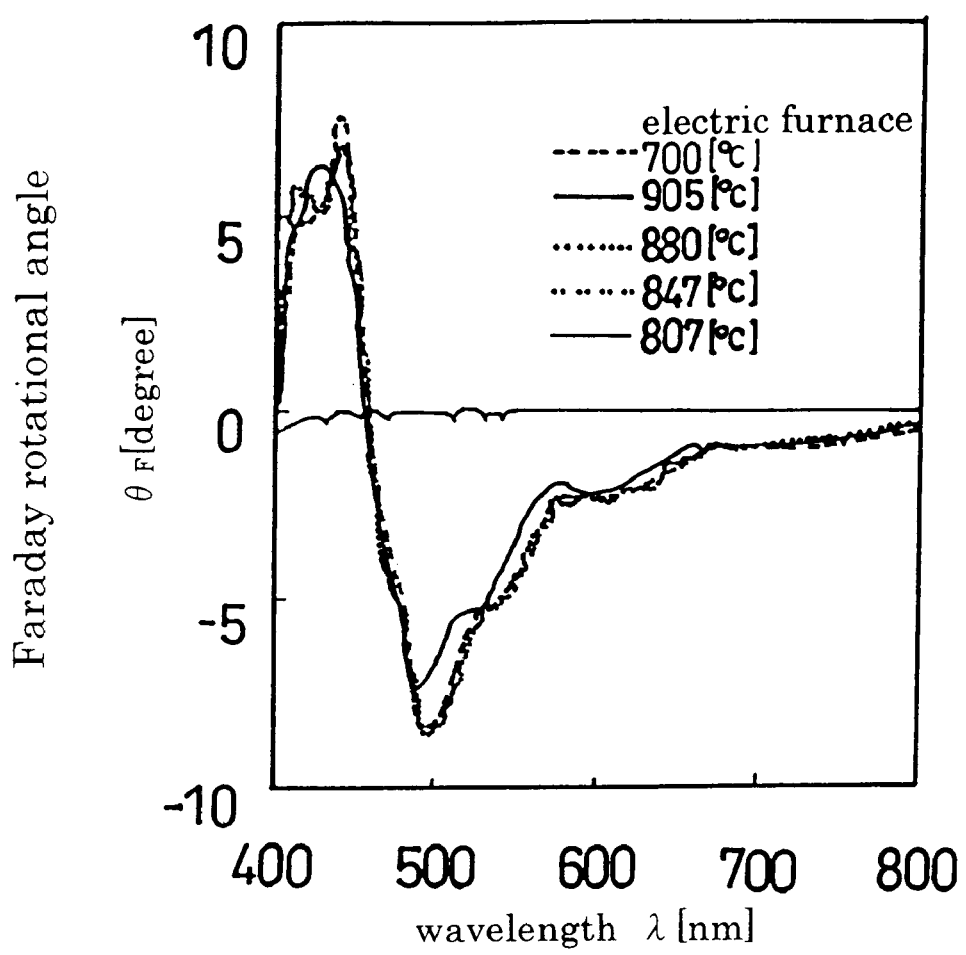
FIG. 5 is a view showing the Faraday rotational angle of the one dimensional magnetic optical crystal subjected to heat treatment for crystallization.

During the heat treatment with the infrared ray introducing heater 220 the thermocouple 223 is allowed to contact with the surface of the glassy carbon 204 to monitor the temperature. The heat treatment pattern is shown in FIG. 3. Further, The X ray diffraction pattern and the Faraday rotational angle when the member is subjected to the heat treatment for crystallization by such heat treatment are shown in FIG. 4 and FIG. 5, respectively. In the BiYIG thin film 207 that has an amorphous structure immediately after the film formation, crystallization thereof progresses at a heat treatment temperature of 850° C., and the Faraday rotational angle shows the same value as in the case where the film is heated and crystallized with a conventional electric furnace. Further, no surface roughening or a crack is found in the BiYIG thin film 207 at all.

On the other hand, a substrate made of a thermoplastic resin such as PMMA (polymethyl methacrylate) and PC (polycarbonate) is heated by the same heating process to perform a preliminary experiment. As a result, it has been found that no deformation or the like in the substrate occurred, confirming that the above heat treatment does not brings about deformation or the like to the polymeric substrate 203.

Further, heating treatment is performed on the multi-layer film having the $(SiO_2/Ta_2O_5)^n/(Ta_2O_5/SiO_2)^n$ structure by the same heating process, and transmissivity spectrum is measured on the multi-layer film before heating and after heating. The results are shown in FIGS. 6A, 6B and FIGS. 7A, 7B. The design wavelength at this point is 750 nm and the thickness of each layer is ¼ of the optical wavelength.

Figure 6A:
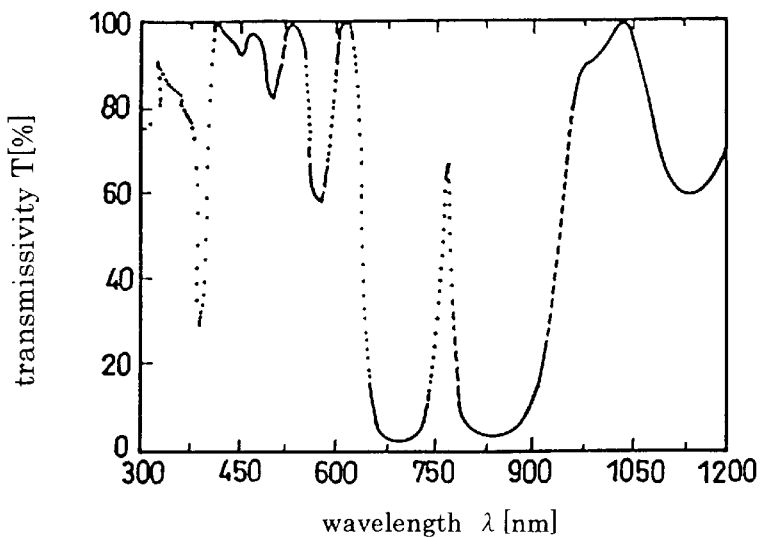
FIGS. 6A and 6B are views showing the transmissivity spectrum of a dielectric multi-layer film before heating.
Figure 6B:
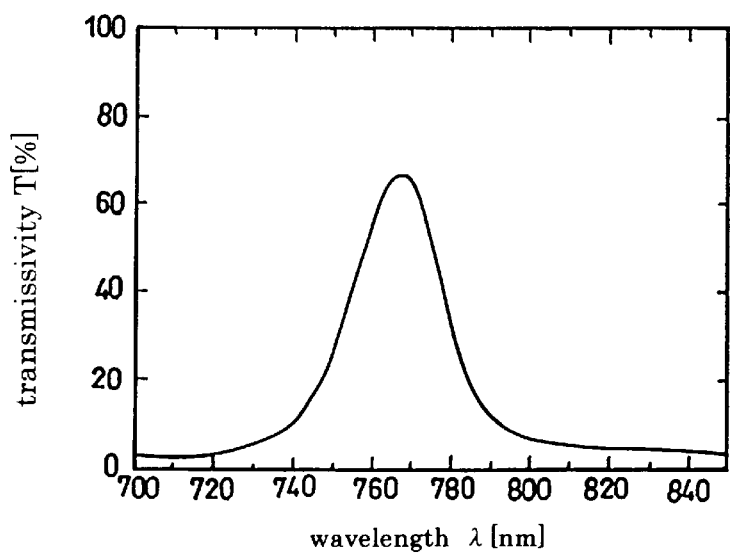
Figure 7A:
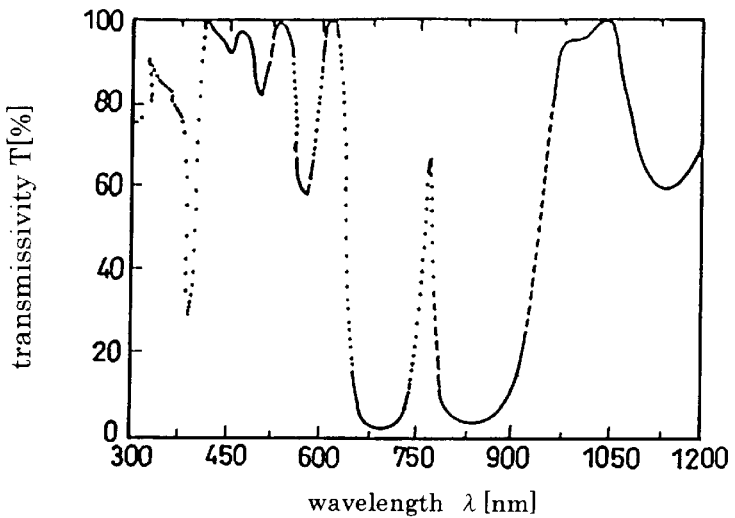
FIGS. 7A and 7B are views showing the transmissivity spectrum of the dielectric multi-layer film after heating.
Figure 7B:
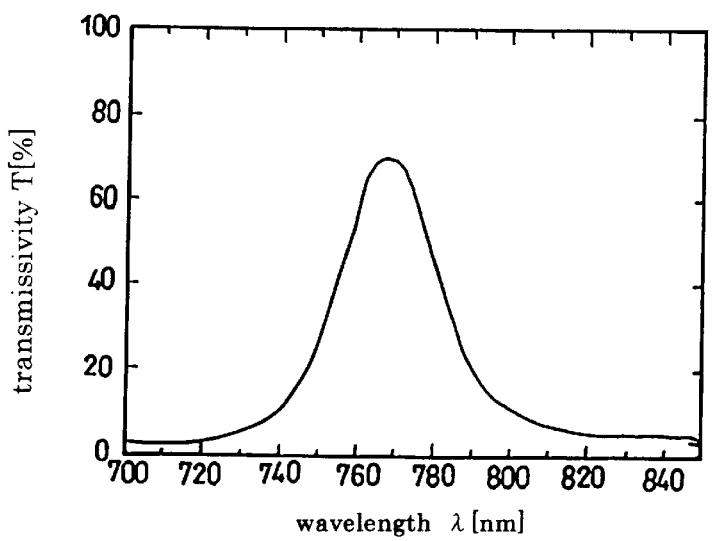

FIG. 6A shows a transmissivity spectrum before heat treatment, and FIG. 6B shows the peak wavelength spectrum (partially enlarged transmissivity spectrum in FIG. 6A). FIG. 7A shows a transmissivity spectrum after heat treatment, and FIG. 7B shows the peak wavelength spectrum in FIG. 7A (partially enlarged transmissivity spectrum in FIG. 7A).

It can be seen from FIGS. 6A and 6B (before heating) that a photonic band gap appears in the wavelength region of $\lambda$=650 to 900 nm, and a sharp peak appears at a position of $\lambda$=765 nm. Also seen from FIGS. 7A and 7B (after heating) is that a photonic band gap appears in the wavelength region of $\lambda$=650 to 900 nm, and a sharp peak appears at a position of $\lambda$=765 nm. Thus, as can be understood by comparing FIGS. 6A, 6B with FIGS. 7A, 7B, the waveforms of the transmissivity spectrums before heating and after heating are scarcely different from each other. This means that the cyclic structure of the multi-layer film having the $(SiO_2/Ta_2O_5)^n/(Ta_2O_5/SiO_2)^n$ structure barely changes under a heat treatment condition which can crystallize the BiYIG thin film 207 by irradiation of the infrared beam using the infrared ray introducing heater 220.

Figure 8:
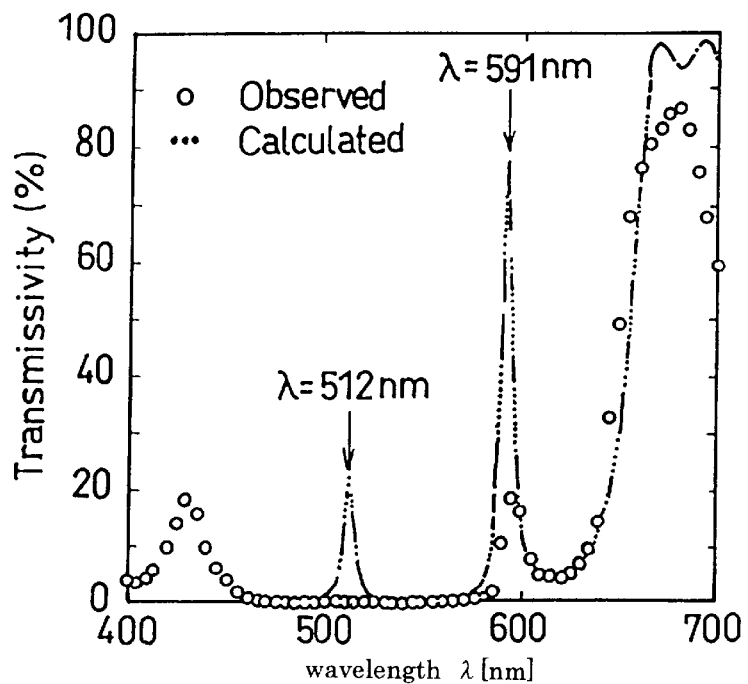
FIG. 8 is a view showing the transmitted wavelength spectrum of the one dimensional magnetic optical crystal of FIG. 2.
Figure 9:
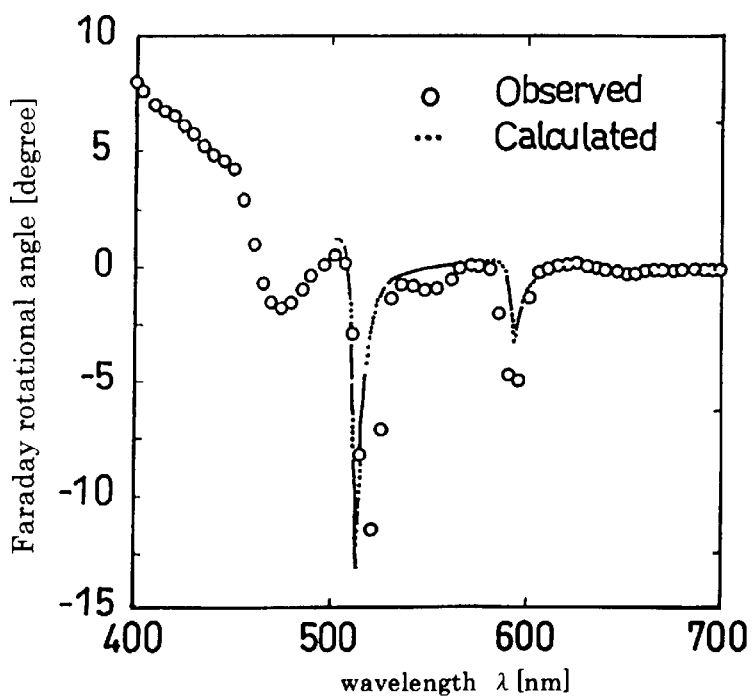
FIG. 9 is a view showing the Faraday rotational angle of the one dimensional magnetic optical crystal of FIG. 2.

Regarding the above-mentioned one dimensional magnetic optical crystal 200 (one dimensional photonic crystal) with the $(SiO_2/Ta_2O_5)^n/BiYIG/(Ta_2O_5/SiO_2)^n$ structure which is formed by subjecting the $(SiO_2/Ta_2O_5)^n/BiYIG$ to heat treatment and depositing the $(Ta_2O_5/SiO_2)^n$ film thereon, the transmitted wavelength spectrum and Faraday rotational angle are measured. The results are shown in FIG. 8 and FIG. 9. As shown in FIG. 9, this one dimensional magnetic optical crystal 200 is found to have a large Faraday rotational angle.

In this embodiment since the infrared beam is adapted to be intermittently emitted (pulse heated), the crystallization of the BiYIG thin film 207 uniformly progresses to thereby obtain high accuracy.

Further, in this embodiment, the infrared beam is condensed with the glassy carbon 204 to rapidly carry out the heat treatment. Incidentally, this embodiment may be configured so that the heat treatment is carried out without providing this glassy carbon 204.

Figure 10:
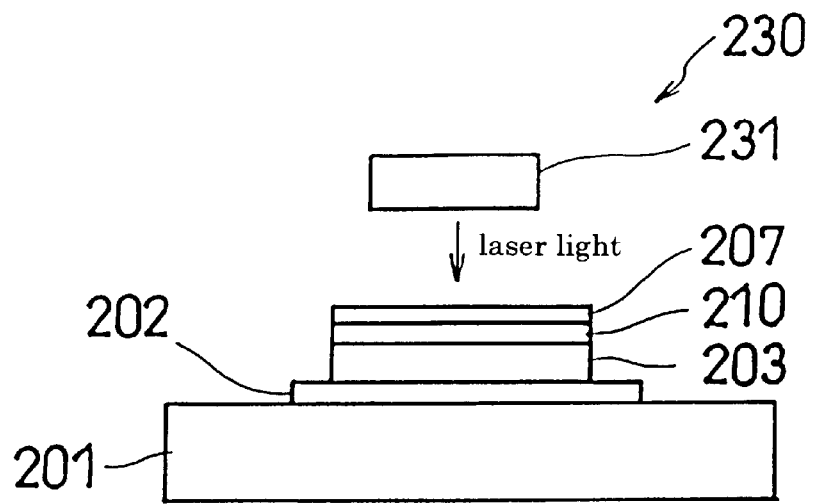
FIG. 10 is a view showing a laser heater according to a second embodiment of the present invention.

The first embodiment takes as an example the case where the heat treatment for crystallization of the BiYIG thin film 207 is carried out using infrared beam from the infrared ray introducing heater 220. However, the heat treatment for crystallization of the BiYIG thin film 207 may be carried out using laser light from a laser heater 230 (hereinafter referred to as a second embodiment) provided in place of the infrared ray introducing heater 220 as shown in FIG. 10.

In this second embodiment, a polymeric substrate 203 is set on a substrate holder 201 with one surface of which the $(SiO_2/Ta_2O_5)^n/BiYIG$ film is formed upward, and the $(SiO_2/Ta_2O_5)^n/BiYIG$ is irradiated with laser light from a laser light source 231 while scanning the laser light in a wide range to crystallize the BiYIG thin film 207.

Figure 11:
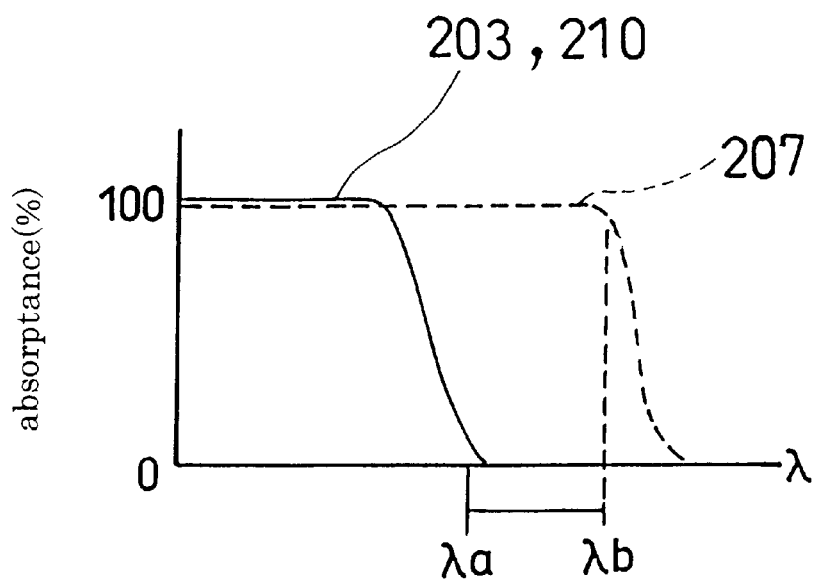
FIG. 11 is a view showing a characteristic of laser light used in the laser heater of FIG. 10.

Used in this case is the laser light having a wavelength with which the light is not absorbed into the polymeric substrate 203 and the $(SiO_2/Ta_2O_5)^n$ layer 210 (dielectric multi-layer film) but is absorbed into the BiYIG thin film 207 (magnetic material film). For example, as shown in FIG. 11, laser light having a wavelength of $\lambda_a$ or more with which the light is not absorbed into the polymeric substrate 203 and the $(SiO_2/Ta_2O_5)^n$ layer 210 (dielectric multi-layer film) and the wavelength $\lambda_b$ or less with which the light is absorbed into the BiYIG thin film 207 (magnetic material film), that is, laser light in a wavelength range of ($\lambda_a$ to $\lambda_b$) is used. Further, the laser light is intermittently emitted (pulse-heated).

In this second embodiment, since the $(SiO_2/Ta_2O_5)^n$/BiYIG film is irradiated with the laser light having a wavelength with which the light is not absorbed into the polymeric substrate 203 and the $(SiO_2/Ta_2O_5)^n$ layer 210 (dielectric multi-layer film) but is absorbed into the BiYIG thin film 207 (magnetic material film), the $(SiO_2/Ta_2O_5)^n$ layer 210 (dielectric multi-layer film) is prevented from temperature rise also by the irradiation of the laser light, so that interdiffusion of $Ta_2O_5$ and $SiO_2$ in $(SiO_2/Ta_2O_5)^n$ layer 210 is prevented. On the other hand, only the BiYIG thin film 207 is heated by the irradiation of the laser light and is crystallized.

In the heat treatment with the above-mentioned laser light, the polymeric substrate 203 does not absorb the laser light and is prevented from temperature rise. Thus, as the polymeric substrate 203, a thermoplastic resin substrate or a tape-shaped, film-shaped, or sheet shaped substrate can be used, realizing easy handling of the substrate and downsizing.

In the above-mentioned conventional art, when an optical magnetic recording medium(magnetic optical member) is obtained using BiYIG, heat treatment at 600° C. or more is required to obtain excellent magnetic optical characteristics by crystallizing BiYIG. Thus, it has been required to use glass as a substrate. On the other hand, in the present embodiment, the polymeric substrate 203 is prevented from temperature rise as mentioned above, and it is not necessary to use the glass as a substrate. Thus, the guiding groove for laser light is easy to form, and since a substrate is not limited to glass (heat-resisting member), the member is applicable in wider field, whereby the improvement of the productivity can be attained.

Further, since the $(SiO_2/Ta_2O_5)^n$ layer 210 is prevented from temperature rise described above and the interdiffusion of $Ta_2O_5$ and $SiO_2$ in the $(SiO_2/Ta_2O_5)^n$ layer 210 can be prevented, the crystallizing heat treatment of the BiYIG thin film 207 can be performed. Further, by subjecting the BiYIG thin film 207 to heat treatment to crystallize, excellent magnetic characteristics are generated and the one dimensional magnetic optical crystal 200 (one dimensional photonic crystal) having excellent magnetic optical characteristics is produced. This one dimensional magnetic optical crystal 200 can be used as an optical magnetic recording medium, owing to excellent magnetic characteristics of the BiYIG thin film 207 obtained through crystallization.

Further, in the second embodiment, since the laser light is adapted to be intermittently emitted (pulse heated), crystallization of the BiYIG thin film 207 uniformly progresses to thereby obtain high accuracy.

Further, while scanning the laser light in a wide range, the $(SiO_2/Ta_2O_5)^n$/BiYIG is irradiated with the laser light. Accordingly, heating of the BiYIG thin film 207 can rapidly progress, whereby improvement of the productivity can be attained.

Further, in the second embodiment, the cooling mechanism 222 and the cooling treatment which are required in the first embodiment are not needed. Therefore, the configuration of this embodiment becomes simpler and no cooling operation is needed, improving the productivity of the invention.

The one dimensional magnetic optical crystal 200 (magnetic optical member) which can be obtained in the first and second embodiments has the large Faraday effect as mentioned above, and can exhibit excellent functions when used in various optical devices such as an optical magnetic recording medium (optical magnetic recording disk) and an optical isolator.

The first and second embodiments take as an example a case where the BiYIG thin film 207 is used. However, the present invention is not limited to this and can use other rare earth iron-garnet thin films.

According to the first aspect of the present invention, the magnetic optical member comprising a rare earth iron-garnet magnetic optical thin film and the crystalline magnetic optical thin film can exert excellent magneto-optical effects.

According to the sixth aspect of the present invention, the rare earth iron-garnet magnetic optical thin film is crystallized by pulse heating in which infrared beam is intermittently emitted without deforming the polymeric substrate. Thus, when the polymeric substrate is formed with a thermoplastic resin, or in a tape shape, a film shape or a sheet shape, it can be further easily handled as compared with the case where a glass substrate is used, and can be reduced in size.

Further, by cooling the polymeric substrate or preventing the temperature rise of the substrate, deformation thereof is prevented. Thus, as the polymeric substrate, a thermoplastic resin substrate or a tape-shaped, film-shaped, or sheet-shaped substrate can be used, whereby easy handling of the substrate and downsizing can be realized. Additionally, since a glass substrate is not required to use, the guiding groove for laser light is easy to form. The substrate is not limited to glass (heat-resisting member), making the member applicable in wider field, and improving the productivity of the invention.

What is claimed is:

1. A method of producing a magnetic optical member comprising:

two dielectric multi-layer films having a cyclic structure in which plural kinds of dielectric materials having different optical characteristics are alternately laminated with regularity in thickness;

a magnetic optical thin film of rare earth iron-garnet placed between one of two dielectric multi-layer films and the other of two dielectric multi-layer films; and a polymeric substrate on which said magnetic optical thin film and two dielectric multi-layer films are formed;

wherein:

said magnetic optical thin film is laminated over said polymeric substrate with one of said two dielectric multi-layer films interposed therebetween, while placing said polymeric substrate over a water-cooled substrate holder through an indium sheet;

a glassy carbon is placed on a surface of said magnetic optical thin film; and said glassy carbon is heated by pulse heating with intermittent irradiation by an infrared beam to crystallize said magnetic optical thin film without deforming said polymeric substrate.

2. A method of producing a magnetic optical member comprising:

two dielectric multi-layer films having a cyclic structure in which plural kinds of dielectric materials having different optical characteristics are alternately laminated with regularity in thickness;

a magnetic optical thin film of rare earth iron-garnet placed between one of two dielectric multi-layer films and the other of two dielectric multi-layer films; and a polymeric substrate on which said magnetic optical thin film and said two dielectric multi-layer films are formed;

wherein:

said magnetic optical thin film is laminated over said polymeric substrate with one of said two dielectric multi-layer films interposed therebetween, and said polymeric substrate is directly cooled;

a glassy carbon is placed on a surface of said magnetic optical thin film; and said glassy carbon is heated by pulse heating with intermittent irradiation by an infrared beam to crystallize said magnetic optical thin film without deforming said polymeric substrate.

* * * * *